United States Patent
Matthews et al.

(10) Patent No.: US 10,056,852 B2
(45) Date of Patent: Aug. 21, 2018

(54) CONTROLLER FOR EC MOTOR AND METHOD THEREOF

(71) Applicant: Canarm Ltd., Brockville, Ontario (CA)

(72) Inventors: Douglas Matthews, Brockville (CA); Claude Bouchard, Joliette (CA); Nora Wolske, Brockville (CA)

(73) Assignee: Canarm Ltd., Brockville, Ontario (CA)

( * ) Notice: Subject to any disclaimer, the term of this patent is extended or adjusted under 35 U.S.C. 154(b) by 0 days.

(21) Appl. No.: 15/407,892

(22) Filed: Jan. 17, 2017

(65) Prior Publication Data

US 2017/0214341 A1    Jul. 27, 2017

Related U.S. Application Data

(60) Provisional application No. 62/318,478, filed on Apr. 5, 2016, provisional application No. 62/299,175, filed on Feb. 24, 2016, provisional application No. 62/281,813, filed on Jan. 22, 2016.

(51) Int. Cl.
| | |
|---|---|
| *H02P 6/08* | (2016.01) |
| *H02K 11/22* | (2016.01) |
| *H02P 27/08* | (2006.01) |
| *H02P 6/17* | (2016.01) |

(52) U.S. Cl.
CPC ............. *H02P 6/08* (2013.01); *H02K 11/22* (2016.01); *H02P 6/17* (2016.02); *H02P 27/08* (2013.01)

(58) Field of Classification Search
CPC ... H02P 6/08; H02P 27/08; H02P 6/17; H02K 11/22

USPC .......................................................... 318/461
See application file for complete search history.

(56) References Cited

U.S. PATENT DOCUMENTS

| | | |
|---|---|---|
| 4,769,581 A | 9/1988 | Rilly |
| 4,780,652 A | 10/1988 | Rilly |
| 6,380,702 B1 | 4/2002 | Rottmerhusen |
| 8,102,167 B2 | 1/2012 | Irissou et al. |
| 9,178,451 B2 | 11/2015 | Soh |
| 2009/0243582 A1* | 10/2009 | Irissou ............... H05B 39/02 323/320 |
| 2011/0279070 A1* | 11/2011 | Tanaka ............... H02P 6/181 318/400.1 |

(Continued)

FOREIGN PATENT DOCUMENTS

| | | |
|---|---|---|
| JP | 2000014181 | 1/2000 |
| JP | 2008193882 | 8/2008 |

*Primary Examiner* — Shawki S Ismail
*Assistant Examiner* — Bradley Brown
(74) *Attorney, Agent, or Firm* — Hovey Williams LLP

(57) ABSTRACT

Rotation speed control systems for an Electronically Commutated (EC) motor and method for controlling rotation speed of an EC motor are described. An rotation speed control system includes a phase detector for detecting a period, an ON time interval, an OFF time interval, and zero crossing time points of the phase cut AC signal; a voltage regulator for converting the phase cut an AC signal into a DC signal; a controller for generating a compatible waveform to drive the EC motor with a rotation speed instructed by the controller, in accordance with an ON/OFF time ratio determined based on the ON time interval and OFF time interval of the phase cut AC signal; and an EC motor interface, powered by the DC signal, for driving each of a plurality of windings of the EC motor with the compatible waveform.

38 Claims, 5 Drawing Sheets

(56) References Cited

U.S. PATENT DOCUMENTS

2014/0313643 A1\* 10/2014 Westrick, Jr. ............ H02H 3/00
  361/641
2015/0188462 A1\* 7/2015 Soh .......................... H02P 6/08
  318/400.13

\* cited by examiner

CONTROLLER FOR EC MOTOR AND METHOD THEREOF

CROSS REFERENCES TO RELATED APPLICATIONS

This application claims priority based on U.S. provisional patent application No. 62/281,813, entitled "CONTROLLER FOR EC MOTOR AND METHOD THEREOF", filed Jan. 22, 2016, U.S. provisional patent application No. 62/299,175, entitled "CONTROL SYSTEM AND METHOD FOR AN EC MOTOR" filed Feb. 24, 2016, and U.S. provisional patent application No. 62/318,478, entitled "ROTATION SPEED CONTROL SYSTEM AND METHOD FOR AN EC MOTOR" filed Apr. 5, 2016, all of which are herein incorporated by reference.

FIELD OF THE INVENTION

The present invention generally relates to a controller for a brushless direct current motor, more specifically to a rotation speed control system for an Electronically Commutated (EC) motor and a method for controlling the rotation speed of such a motor.

BACKGROUND OF THE INVENTION

Electric motors are a major consumer of energy but some types are relatively inefficient. The induction motor, the most common type of AC motor, has been around for over a century. They are provided in many sizes and power levels and are still widely used in many industries. However, their outdated design limits their efficiency.

The Electrically Commutated (EC) motor is an alternative solution proving to be a major source of energy savings, which is gaining popularity in many fields and applications. EC motors usually provide energy savings and allow reductions of size, weight and noise when integrated into a system such as an exhaust fan. These motors are increasingly available in various sizes and power outputs. An EC motor can make products simpler and smarter by allowing added features, more reliability and better performance.

There are some design differences between an Alternating Current (AC) induction motor and an EC motor. Although used in many types of applications, the operation of AC induction motors is fairly simple. AC power is supplied to the stator creating a magnetic field. The magnetic field rotates at the frequency of the AC voltage supplied, inducing an opposing current in the rotor. The rotor then responds by turning in an opposed direction to the rotating magnetic field. The speed of such a motor is dependent on the frequency of the input voltage and the number of poles in the motor, but cannot be higher than the synchronous speed. Three of the most common induction motors available are: 1) Shaded pole with a smaller fractional hp, with low torque; 2) Capacitor run and capacitor start motors, both requiring an additional capacitor to operate; 3) Three-phase motors which run on three phase supply voltage.

EC motors are Direct Current (DC) motors requiring no brushes. The stator has a set of fixed windings and the rotor contains permanent magnets. The phases in the stator's fixed windings are continually switched by a circuit board which keeps the motor rotating. Since it is the commutation electronics that control the speed of the motor, EC motors are not limited to synchronous speeds. In the past, the lower power output of DC and EC motors has restrained them to applications such as small fans, pumps, servomotors and motion control systems. However, advances in electronics and materials are allowing larger output motors, up to the 12 kW and higher. There are now virtually no restrictions for these motors that are now increasingly used in applications such as small appliances, electric vehicles and large rooftop condenser units.

The most common reason for choosing an EC motor over an AC motor is its efficiency. Since the commutation in an EC motor is provided electronically, it reduces the losses inherent to the AC motor.

An EC motor works differently from an AC motor. An EC motor contains a power supply and power driver to supply constant voltage sequenced with a precise timing through preferably three motor's wiring regardless of the AC input voltage.

The ability to control the speed of an EC motor permits a high level of efficiency. AC motors are available in various speeds and can also be controlled with external devices, but these can generate other problems such as noise and lack of optimization for the system. Variable Frequency Drives (VFDs) can control three-phase motors, but in order to properly protect the motor from damage, a complex system of filtering and protection is required.

Many EC motors offer Bus communication, such as Modbus. Two-way communication between a device and a motor, with information-rich feedback, is now available through Bus communication. For example, Bus communication can be easily integrated in building management systems where each motor can be referenced individually or in groups, and the status of individual fans can be seen and changed as needed.

In complicated control scenarios, it is now possible to include such features as loosening a blocked rotor by reversing rotation on start-up or loosen frozen fan blades using a soft start override. A default setting under Bus communication interruption can also be programmed for the electronics.

EC motors can also be used in multiple motor operation. For example, in multiple fan systems (rooftop condensers for instance), it is possible to have one fan as the master controlling all the other fans. Since the EC motor integrates all the necessary logic, a separate controller is no longer needed.

SUMMARY

According to one aspect, the invention relates to a system and method for controlling the speed of an EC motor by means of a phase-control circuit such as a Triac circuit.

An object of the present invention is to provide a rotation speed control system for an Electronically Commutated (EC) motor to control the operation of the EC motor in an efficient manner.

According to one aspect, there is provided a rotation speed control system for an EC motor, comprising a triac circuit operatively linked to an EC motor interface and optionally an EC motor. In one aspect, we disclose:
  a phase detector for detecting a period, an ON time interval, an OFF time interval, and zero crossing time points of a phase cut AC signal;
  a voltage regulator for converting the phase cut AC signal into a DC signal;
  a controller for determining an on/off time ratio based on the ON time interval and OFF time interval of the phase cut AC signal, and for further determining a speed to be instructed to the EC motor based on the on/off time ratio, and for generating a compatible waveform to drive the EC motor with the speed instructed; and an EC motor interface, powered by the DC signal, for driving each of a plurality of windings of the EC motor with the compatible waveform.

According to another aspect, there is provided a rotation speed control system, comprising:

a voltage regulator for converting a phase cut signal to a DC signal;

a temperature probe for detecting ambient temperature of a selected environment, a temperature potentiometer for pre-setting a selected target temperature;

a controller for comparing the actual temperatures detected by the temperature probe with the target temperature whereby if the first temperature is different than the target temperature, the controller instructs a speed and generates compatible wave forms to produce the speed on the EC motor; and an EC motor interface, powered by the DC signal, for driving each of a plurality of windings of the EC motor with the compatible waveform.

According to another aspect, there is provided a method for controlling rotation speed of an EC motor, comprising:

converting a phase cut AC signal to a DC signal;

detecting zero-crossing, period, and off time interval of the phase cut AC signal;

determining an on/off time ratio based on the period and the off time interval of the phase cut AC signal;

instructing a speed of the EC motor based on the on/off time ratio;

generating a compatible waveform for driving the EC motor with the instructed speed; and powering the EC motor with the DC signal.

DETAILED DESCRIPTION

Phase-control circuits were originally developed for incandescent lighting and AC motor speed control, where the lamp brightness and motor speed are directly dependent on the average power in the AC input. By cutting out a portion of the AC waveform, the power is reduced and the AC motor slows down.

Figures 1A, 1B:
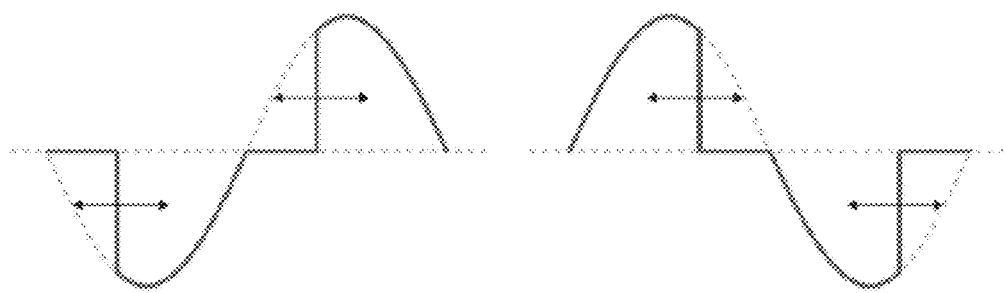
FIG. 1A is a schematic diagram showing a forward (TRIAC) phase control signal.
FIG. 1B is a schematic diagram showing a reverse (ELV) phase control signal.

Triac-based circuits operate by cutting out a portion of the AC waveform. The most common type cuts out a portion of the leading edge of the AC waveform, as shown in FIG. 1A. The circuit senses each zero-crossing of the AC input, and waits for a variable delay period before turning on the Triac switch and delivering the AC to the load. The AC input to the motor therefore has a bite out of the leading edge of each half sine wave. The type of the sine wave generated by the Triac-based circuit is sometimes called forward phase signal, as shown in FIG. 1A.

A second similar type of circuit operates in the reverse manner, by cutting a portion of the trailing edge of each half sine wave, as shown in FIG. 1B. This type of speeding is sometimes called reverse phase signal, and is designed for use in electronic low voltage (ELV) applications.

Figure 2:
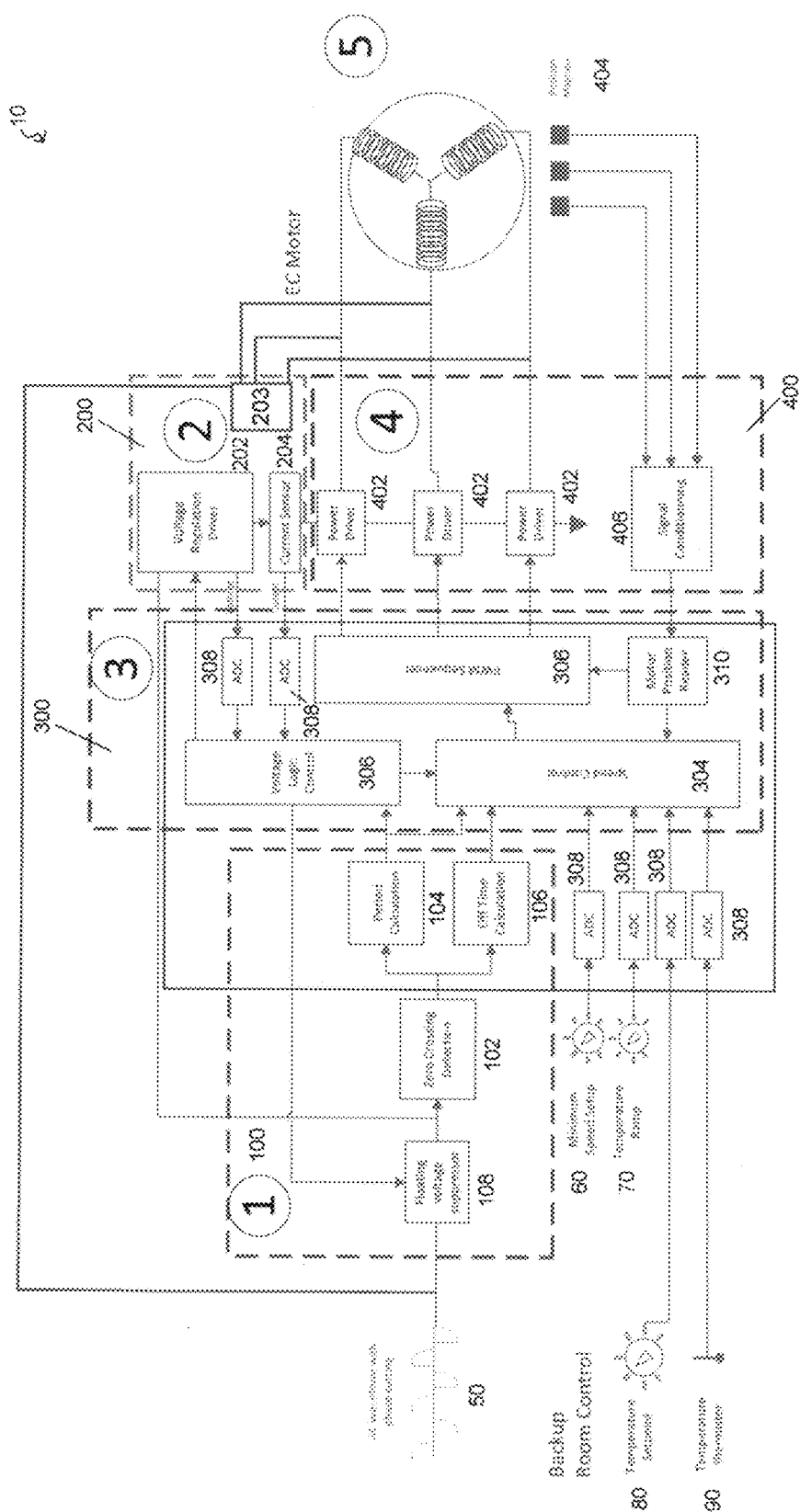
FIG. 2 is a schematic diagram showing a rotation speed control system for an EC motor according to an embodiment of the invention.

Referring to FIG. 2, the rotation speed control system 10 comprises a phase detector 100, a voltage regulator 200, a controller 300, and an EC motor interface 400.

According to FIG. 2, phase-cut AC electrical signals 50 are input into the phase detector 100 and the voltage regulator 200. The phase-cut AC electrical signals 50 may be generated by a phase-cutting circuit, for example, a Triac or an Insulated-gate bipolar transistor (IGBT) circuit. The phase detector 100 comprises a Zero Crossing detector 102, a period calculator 104, and an OFF Time Calculator 106. As shown in the example of FIG. 2, the phase detector 100 may also include a floating voltage suppressor 108 for receiving the input phase-cut AC electrical signals 50 before they reach zero crossing detection 102 or voltage regulation driver 200.

The input phase-cut AC electrical signals 50 are received by an input port of the Zero Crossing detector 102, which detects amplitudes of input phase-cut AC electrical signals 50 that higher than a pre-determined threshold. The pre-determined threshold may be a "0" or non-zero voltage value within a range of 0.5 volt-0.01 volt. For example, the non-zero voltage value can be 0.05V. The non-zero voltage value as the predetermined threshold may be used to reduce of false triggers of the detection of zero crossing caused by minor fluctuation of the input voltage.

An optocoupler can be used to detect the time of zero crossing points of the input phase-cut AC electrical signals 50. For example, when the voltage amplitude of the active part of the phase-cut AC electrical signals 50 is equal or higher than the pre-determined threshold, the optocoupler detects the time point and establishes the time of the zero crossing points.

In another embodiment, a comparison circuit can be used to compare the voltage of the pre-determined threshold with the input phase-cut AC electrical signals 50. When the voltage of the input phase-cut AC electrical signals 50 is equal or more than the pre-determined threshold, the comparison circuit output a signal to indicate the time points that the zero crossing points are detected. The pre-determined threshold may be, for example, 0 volt.

In another embodiment, a micro-controller can be used to read the voltage amplitudes of the input phase-cut AC electrical signals 50. The micro-controller can further analyze the read voltage amplitudes of the input phase-cut AC electrical signals 50 to determine the time that the zero crossing points are detected. In particular, the Zero Crossing Detector 102 first attenuates the amplitude of the input phase cut AC signal 50 and clamps transient spikes. Secondly, an analog to digital converter (ADC) converts the analog AC signal to a digital signal. The ADC can be placed outside or integrated within of the microcontroller. Thirdly, the digital signal is further filtered to remove the noise and to restore the original signal. Finally, the digital signal is compared to a preset numeric threshold to detect and establish the zero crossing time points.

With the time information of the zero crossing points of the electrical signal 50, the period calculator 104 determines the period of the electrical signals 50 for establishing the time base of a complete signal. In particular, the period calculator 104 determines two consecutive changes of the phase cut signals 50. For example, the period calculator 104 can be an optocoupler or a microcontroller. For a trailing edge signal, the period calculator 104 determines the period of the electrical signals 50 by measuring the time interval marking two consecutive high to low transitions (Tr and Tr') from the optocoupler/micro-controller. In this case the period is determined by Tp=Tr–Tr'. For a leading edge signal, the period calculator 104 determines the period of the electrical signal by measuring the time interval marking two consecutive low to high transitions (Tf and Tf') from the optocoupler/micro-controller. In this case the period is determined by Tp=Tf–Tf'. The period of a phase cut signal is the same as the period of the original signal prior to phase cut process. For example, for a 60 Hz AC electrical signal, the period is 16.667 ms.

The period calculator 104 also determines the active portion of a phase-cut AC electrical signal 50 based on the time information of the zero crossing points on rising edge (Tr) and falling edge (Tf) of the electrical signal 50. In an example, the ON time interval of the phase cut signal 50 (active portion) may be Tai=Tf–Tr.

The OFF Time Calculator 106 determines the off time of the phase cut AC electrical 50 based on the detected zero crossing points information. For example, the OFF Time Calculator 106 may be an optocoupler or a micro-controller. The OFF Time Calculator 106 calculates the OFF time interval by measuring the time interval between two consecutive high to low transitions, for example from a optocoupler, for a trailing edge signal, or two consecutive low to high transitions, for example from a optocoupler, for a leading edge signal.

For example, an OFF time ratio 20% denotes that 20% of the period of the phase cut signal 50 is off time. In other words, the active portion of the phase cut signal 50 is 80% (on time ratio 80%) of the period.

Figure 4:
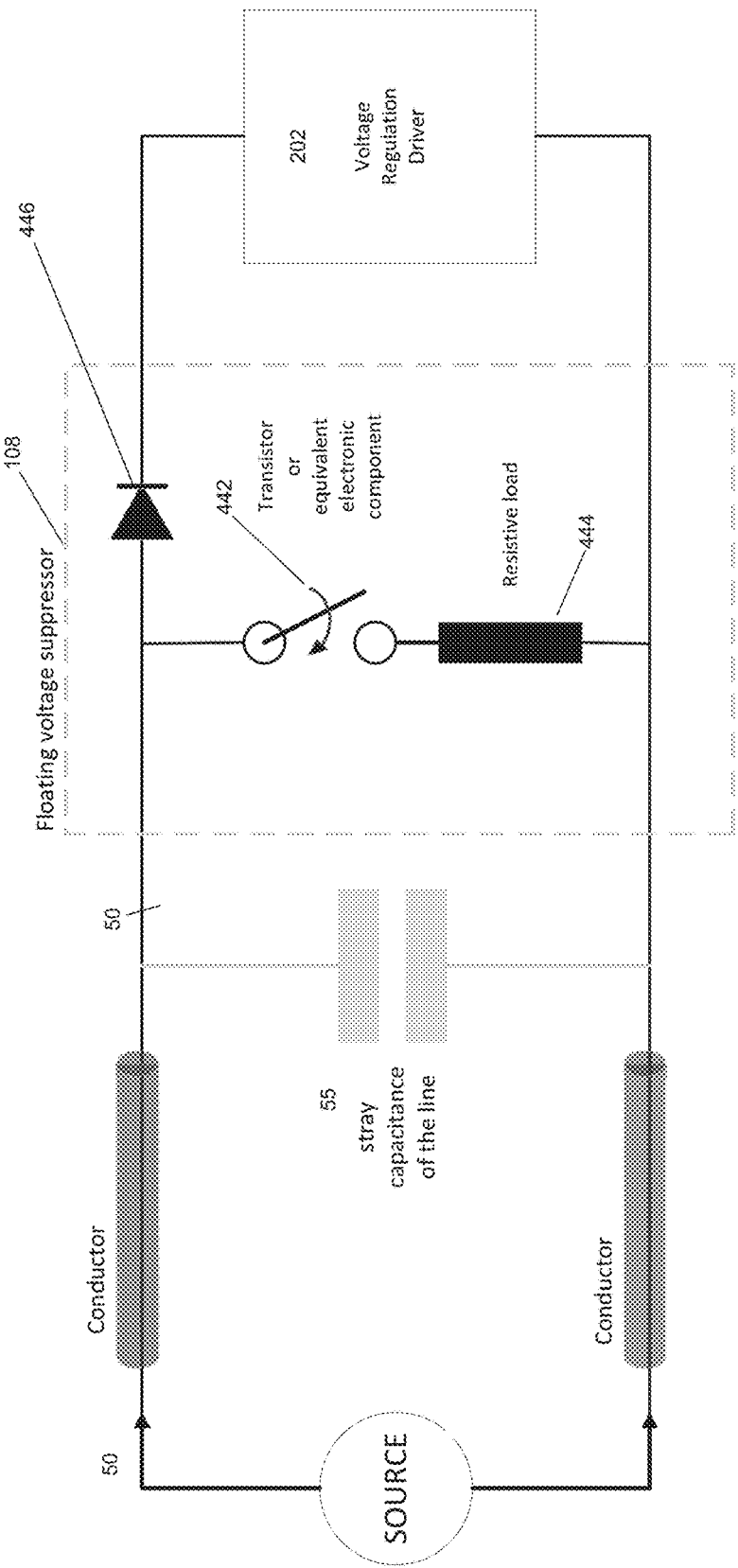
FIG. 4 is a schematic diagram showing a floating voltage suppressor circuit according to an embodiment of the invention.

Optionally, the phase detector 100 may include a floating voltage suppressor 108 for receiving the input phase-cut AC electrical signals 50 before they reach zero crossing detection 102 or voltage regulation driver 200. An exemplary circuit of the floating voltage suppressor 108 is shown in FIG. 4. The floating voltage suppressor 108 may include a transistor 442 or equivalent electronic component, a resistive load 444, such as a resistor, and a diode 446.

To enable the detection of zero crossing, the line voltage must quickly return to the neutral voltage when the phase is cut off by the source. However, most of the line switches (triac controllers, IGBT and other technologies) includes line snubbers to reduce the current incursions. These snubbers generally include a capacitor for maintaining a line voltage during the inactive period of the line switch. The capacitor allows current to pass through to bias the phase detector 100 and this may introduce an error in the interpretation of the signal's zero crossing. The floating voltage suppressor 108 reduces noise or residual voltages of any mechanism by applying a momentary dynamic load at a defined interval. The application of this charge creates a sufficient attenuation which allows the zero crossing detector 102 to detect and record an accurate zero-crossing time point and to mark the end or the beginning of the active period.

The controlled momentary dynamic load may comprise the power transistor 442 controlled by the Voltage Logic Control (VLC) 302 of the controller 300. The VLC 302 applies a limited current load by shorting the power transistor 442 to pass the input phase-cut AC electrical signals 50 to the resistive load 444. Because the load is limited and temporary, this charge is not visible during the active period of the line switch. Moreover, by controlling the load switching time, the energy loss is limited, which allows to maintain optimum efficiency and minimize heat loss in the engine controller.

As well, in FIG. 4, when the Voltage Regulation Driver 202 does not sink a significant current, a stray capacitance 55 of the line blinds the zero crossing detector 102 from the real phase cut waveform of the source by forming a closed circuit comprising the stray capacitance, the transistor 442 and the resistive load 444. A simple resistor 444 can be added in parallel of the line to drain the stray capacitance but the resistor 444 dissipates thermal energy in the active part of the source.

To eliminate stray capacitance voltage of the source with a minimum energy lost when the voltage regulation driver 302 does not sink any current, the VLC 302 controls the transistor 442 of the floating voltage suppressor 108 to become shorted momentarily to sink the charge of the stray capacitance of the line by forming a closed circuit comprising the stray capacitance, the transistor 442 and the resistive load 444 and the charge of the stray capacitance of the line can pass to the resistive load 444. Because the on time is very short, the energy lost is very low.

The diode 446 of the floating voltage suppressor 108 avoids the use of the capacitor of the voltage regulation driver 202 for sinking the current during this process.

The voltage regulator 200 converts the received phase-cut AC electrical signals 50 into DC voltage to power the EC motor. In an embodiment, the voltage regulator 200 comprises a voltage regulator driver 202, which converts the phase-cut AC electrical signals 50 into DC signals. The DC signals are supplied to the power drivers 402 of the EC motor interface 400. For example, 240V AC phase cut signals can be converted to 300V DC signals by the voltage regulation driver 202. The converted DC voltage information is digitized, via an Analog to Digital Converter (ADC) 308, and reported to the VLC 302 of the controller 300.

Optionally, the voltage regulator 200 may further include a current sensor 204 to detect the current of the DC signals. The current sensor 204 measures the DC current output by the voltage regulation driver 202 to the motor windings of the EC motor, and with the DC voltage information, senses the power supplied to power driver 402 of the EC motor interface 400.

Optionally, the voltage regulator 200 may further comprise an accumulator 203 to establish a trigger level of energy. The accumulator 203 stores a minimum level of energy that can be discharged to power the EC motor. For example, the accumulator 203 can be a capacitor with high capacitance. The accumulator 203 is charged during the ON time of the phase cut AC electrical signals 50 and discharged to power the EC motor during the OFF time of the phase cut AC electrical signals 50.

The controller 300 controls of the voltage regulator 200 and the EC motor through the motor interface 400. The controller 300 comprises a VLC 302, a Speed Controller (SC) 304, a Pulse Width Modulation Sequencer (PWMS) 306, and a Motor Position Reader (MPR) 310.

In particular, the period information of the phase cut signal 50 determined by period calculator 104 is sent to the VLC 302 and the SC 304. The OFF time information of the phase cut signal 50 is sent to SC 304. The voltage regulation driver 202 sends the digitized DC voltage information, via an ADC 308, to the VLC 302 and SC 304. The current sensor 204 reports the current information, digitized by ADC 308, to the VLC 302. The VLC 302 forwards the digitized DC voltage and current information to the SC 304.

The VLC 302 is to protect the EC motor and the power drivers 402 according to the DC voltage and the DC current applied to the EC motor. The VLC 302 reads the digitized information of the DC voltage and the DC current used to drive the motor windings. The VLC 302 can in turn protect the power drivers 402 and the EC motor from bad functionality by controlling voltage regulation driver 202.

In an example, based on the DC voltage and DC current information received from the voltage regulator 200, if the VLC 302 determines that the voltage and the current of the phase cut AC signals 50 are not in phase, the VLC 302 can control the voltage regulation driver 202 for performing a power factor correction (PFC) compensation.

In another example, if the VLC 302 determines that the received DC current has exceeded or close to the limit of the EC motor, the VLC 302 in turn controls the voltage regulation driver 202 to limit the current of the DC signals within a predetermined level. As such, the current sensor 204 can help protect the EC motor from over-current.

The MPR 310 in FIG. 2 can be used to determine the current magnet position of the rotor of the EC motor. The magnet position can be detected by sensors 404, such as hall sensors. With the position information of the magnet of the rotor, the rotation speed of the rotor can be determined and this information is sent to the SC 304. As well, with the position information of the magnet of the rotor, the information that which winding is energized can also be determined. This information is then sent to the PWMS 306, and the PWMS 306 can then determine the timing and/or frequency to energize right windings according to the position of the rotor magnet position.

The motor performance may also be evaluated based on the information collected by the MPR 310 and recorded by the controller 300 for future diagnosis.

With the information of the period Tp, off time interval of the phase cut AC electrical signals 50, the SC 304 determines the active interval (Tai) of the phase cut AC signal 50 and the ratio of ON time versus OFF time (Active Ratio) of the phase-cut AC electrical signal 50. The ON/OFF time ratio can be determined by Ar=Tai/Tp.

The speed set point is a function of ON/OFF time ratio, namely, the speed set point Sp=F(Ar). This function can be changed based on the technical specification of each EC motor. An example of the relationship of the speed to be instructed to the EC motor and the ON/OFF time ratio (active ratio) of the phase-cut signal 50 is shown in FIG. 3.

Figure 3:
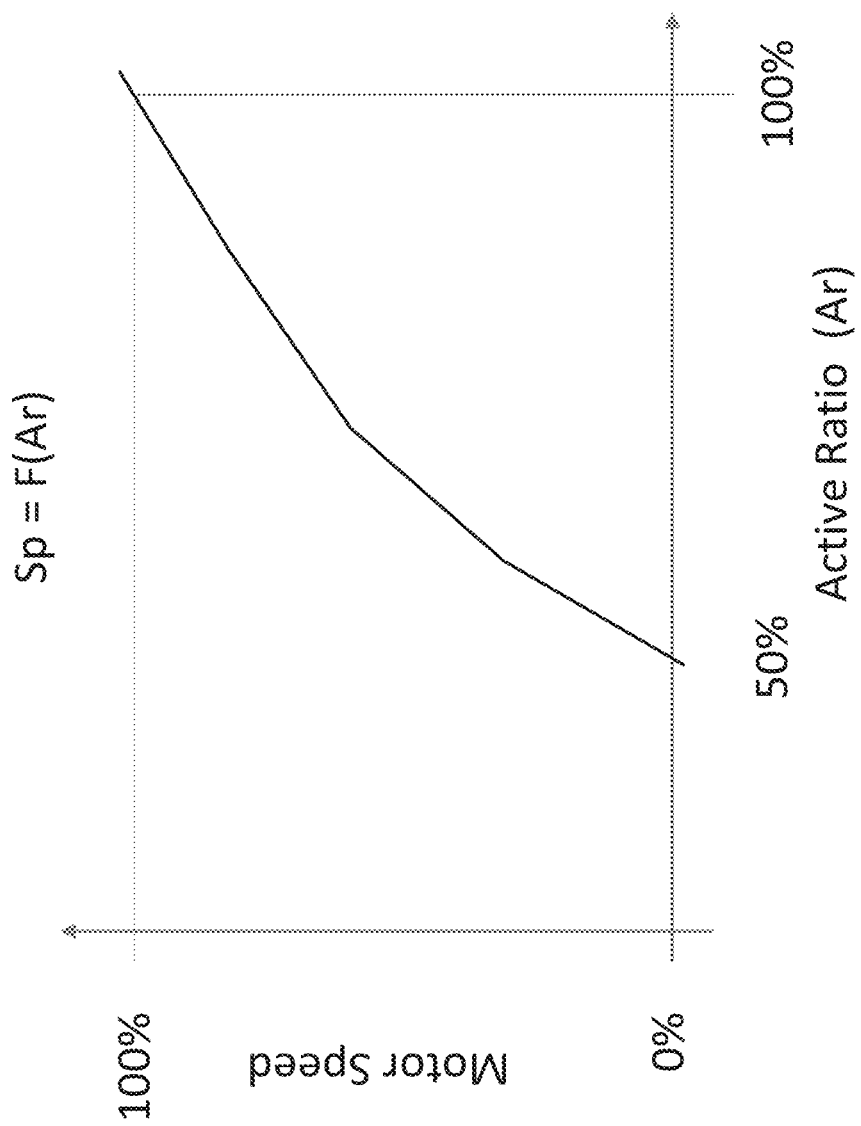
FIG. 3 is a schematic diagram showing the relationship of EC motor speed and the active ratio of the phase cut signal according to an embodiment of the invention.

In the particular example of FIG. 3, the motor starts to rotate when the on-time/off-time ratio is higher than 50%. Each power driver 402 may include a capacitor. Generally, when the active interval (Tai) of the phase cut AC signal 50 (240V AC) reaches 50%, the amplitude is maximum and the capacitor in the power driver 402 of the motor interface circuit can be fully charged. The fully charged capacitor is capable of supporting 100% of the full speed of the EC motor if the EC motor is not subject to any external restrictions, such as opposite force generated by strong wind. Generally, if the motor runs freely without any external frictions or restrictions, 25% active interval (Tai) of the phase cut AC signal 50 provides sufficient power to drive the motor to its full speed.

The capacitor include in the power driver 402 is charged during the active interval of the phase cut AC signal 50 and discharged during the signal is cut according to the current sink by the motor.

If the motor encounters external frictions or restrictions, the VLC 302 will instruct the voltage regulation driver 202 to increase the current, and therefore to increase the power supplied to the EC motor to overcome the external frictions or restrictions and to rotate the motor at the speed setpoint. In this case, the controller 300 will control the current to increase until the maximum power admitted by the motor is reached.

The ON/OFF time ratio is then used to determine the speed set point, or the initial speed, of an EC motor. If the ON/OFF time ratio is below a pre-determined threshold, which is set based on the technical specification of the EC motor, the motor is stopped to avoid motor overheat. If the ON/OFF time ratio is above a pre-set on time ratio, the SC 304 can instruct a speed set point of the EC motor. The speed can be a relative term in percentage (%) of fully cycle of the EC motor speed or in a absolute term such as Round per Minute (RPM) of the EC motor.

In an example, the SC 304 sets the on time ratio at 60%, and the phase cut AC signal is 75% ON and 25% OFF. Then the first 60% of the active interval of the phase cut AC signal is used to build up the minimum voltage for the motor. From this point, the motor speed can be calculated as: (75%-60%)/(100%-60%)=37.5% of the full speed of the EC motor.

In the subsequent speed control, based on the DC voltage and current, the SC 304 determines the necessary DC power for supporting the speed of the EC motor. With the motor position information, the SC 304 can compare the actual speed of the EC motor to the speed set point and adjust the speed of the EC motor. If the actual speed of the EC motor is higher than the set point speed, the SC 304 instructs the PWMS 306 to reduce the speed. If the actual speed of the EC motor is lower than the set point speed, the SC 304 instructs the PWMS 306 to increase the speed.

The contents of the instructions of the SC 304 to the PWMS 306 includes the amplitude and timing or frequency of the waveforms. The waveforms can be, for example, sin waves, trapezoidal waves, and any other suitable wave forms.

With the instructed speed set point or speed to be adjusted, the PWMS 306 generates compatible waveforms for the EC motor to generate the speed instructed by the SC 304. The PWMS 306 generates compatible waveform, which comprises pulses with variable widths at determined time for energizing each of the three windings of the EC motor and controlling the speed of the EC motor. In an example, the amplitude of the output pulses of the PWMS 306 is about 3.3V.

For example, the compatible waveform generated by the PWMS 306 changes the duty cycle (ON time vs OFF time) of the commutation. When this signal (ON/OFF commutation) is filtered by the motor winding, PWMS 306 generates a sine wave. For a three windings EC motor, the PWMS 306 creates 3 simultaneous sine wave shifted by 120 degree with the same frequency. The EC motor speed changes based on the frequency of the sine wave. If the frequency of the sine wave is higher, the speed of the motor is also higher.

The PMWS 306 generates the compatible waveforms to drive the EC motor with a desired speed is well known to a person skilled in the art.

Optionally, the SC 304 may include a minimum speed setup 60 to preset a speed of the EC motor. The speed preset by the minimum speed setup 60 is generally higher than the speed for actuating the EC motor. With the minimum speed setup 60, the SC 304 instructs a speed of the EC motor, if the on time ratio of the phase cut signal supports the speed set by the minimum speed setup 60, and if the ON/OFF time ratio is also sufficient to generate the required speed set by the minimum speed setup 60.

In another embodiment, the SC 304 of the controller 300 includes a standalone running mode for simple installation or in case of failure of the control system. The phase cut detector 100 is not required in this case. The phase cut signal 50 is input into the voltage regulator 200 for converting to a DC signal. Controller 300 perform same functions as set out above except determining the setpoint speed based on the ON/OFF ratio of the phase cut signal 50. The EC motor interface 400 performs the same function as set out above. The mode can be set manually or as a default setting of the control system 10.

In an embodiment, the SC 304 may include an interface with two analog inputs 80 and 90 into a comparator mode of which inverse differential measurement results in a motor speed setpoint. The two inputs can be inputs of environment variables, such as the level of carbon dioxide, temperature, etc.

To activate the standalone running mode, a continuous minimum voltage must be applied simultaneously on both inputs. When the voltage on both inputs are same, the motor begins to run at the minimum speed set by the minimum speed potentiometer 60 to be describe in the example below. The motor runs at full speed when the reverse voltage difference reaches the speed limit set point. This speed limit set point can be set by programming the controller 300 or by adjusting the dedicated potentiometer for this mode.

In an embodiment, as outlined in FIG. 2, the input 90 is connected to a temperature probe or a temperature thermistor, while input 80 is connected to a potentiometer which defines the temperature set point. The voltage difference between inputs 80 and 90 is translated to motor speed. Both the temperature probe and the potentiometer can be resistors. The controller 300 and/or SC 304 sources a weak current through the resistor that creates the voltage read by SC 304. The temperature differences between input 90 a and input 80 will be translated into differences in voltage. It is a linear relation between the temperature of the minimum speed and the temperature ramp, which is set higher than the temperature of the minimum speed. When the temperature input is at the same voltage as the voltage of the potentiometer, the EC motor starts at minimum speed. When the temperature probe reaches the value set by Temperature Ramp 70, the motor turns at maximum speed. When the value of the temperature probe 90 is between temperature set by the potentiometer and the temperature ramp, the speed of the EC motor is a linear interpolation.

The functions of the controller 300 and the period calculator 104 and ON/OFF time calculator 104 can be implemented by, for example, a micro-controller.

The motor interface 400 comprises a plurality of power drivers 402 and a position management system 404. Each the motor winding of an EC motor is electrically coupled to a power driver 402. Each power driver 402 of the motor interface 400 receives commands from the controller 300 through an input port. As described below, the motor interface 400 converts command signals from the PWMS 306 of the controller 300 into power signals. The power signals are typically sent to one or more motor windings. The power signals allow the activation, deactivation, or control of the EC motor.

Power drivers 402 are powered by the Voltage regulation driver 202. Each power driver 302 amplifies the command signal output from the PMWS 306 to convert the command signals into power signals. In the example of FIG. 2, the EC motor has 3 power drivers, one for each motor's winding.

The motor interface 400 also determines the rotor position by using position magnets. The EC motor comprises at least one rotor and a position calculation system, such as position magnets, to determine the rotor position.

Optionally, the motor interface 400 may include a signal conditioning module 406 for suppressing the noise followed by a Schmitt trigger that sharps the transition edges. In an example, the signal conditioning module 406 is a low pass filter.

Determining the rotor position further allows the controller 300 to calculate the rotation speed of the EC motor and the preparation of the next commutation sequence.

The position management system 404 is configured to communicate the rotor position information to the motor position reader 310 of the controller 300. Using the rotor position information, the motion position reader 310 calculates the rotation speed of the motor. The speed of rotation of the rotor is sent to the SC 304 of the controller 300 from the motor position reader 310.

As such, system 10 allows control of an EC motor without specialized control systems that require a wired or wireless communication module and control of EC motor speed from IGBT, Triac and other phase cutting devices. As well, control system 10 provides backward compatibility of existing TRIAC motor controls.

In operation, for each type of EC motor on which the system 10 is mounted, a minimum energy ratio, which may be loaded in the accumulator of the voltage regulator 202, is required for the system 10 to activate the motor. This minimum energy ratio consists of the active portion and the cut portion of the AC electrical wave. This minimum energy ratio provides the motor with the minimum speed. A potentiometer mounted in control system 10 determines the minimum speed of rotation of the motor when the current source provided to the motor is above zero. Below the minimum energy ratio, the motor does not function and the current source provided to the motor is virtually zero. Devices to determine the minimum speed of rotation of the motor above zero may be used. For example, a potentiometer may be mounted in the control system 10 and determines the minimum speed of rotation of the motor above zero.

Figure 5:
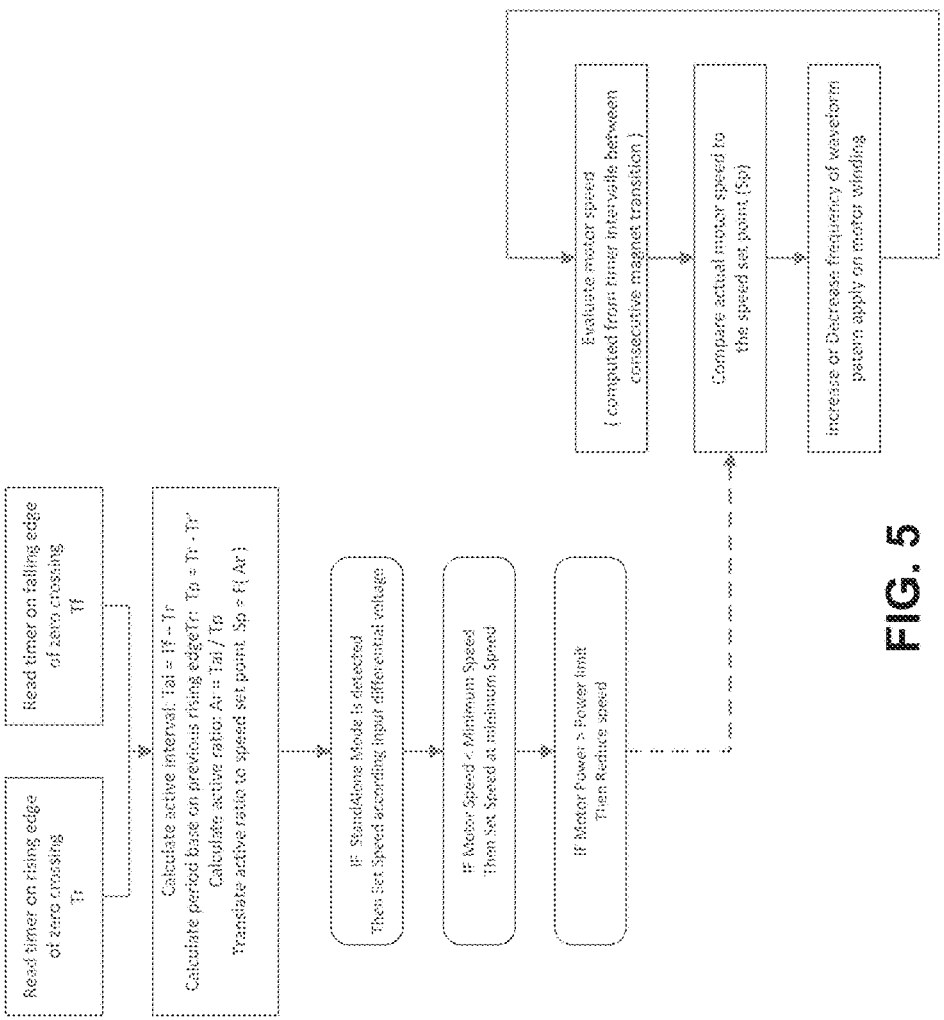
FIG. 5 is a flow chart showing speed regulation of the EC motor based on phase cut signal according to an embodiment of the invention.

FIG. 5 is an exemplary flow chart of the speed regulation of the EC motor. The initial speed set point of the EC motor is based on the ON/OFF time ratio of the phase cut signals 50.

If the motor speed determined by SC 304 is less than the minimum speed, the motor speed will be set at the minimum speed. If the motor power is higher than the power limit of the motor power, then the motor speed is reduced to a speed within the motor power limit.

The SC 304 compares the actual motor speed to the speed set point. If the actual speed of the motor is slower or faster than the speed set point for any reasons, for example, due to the external frictions or restrictions such as voltage, air resistance, dirty impeller, etc., the SC 304 will apply the correction by increasing or reducing DC current to increase or decrease power to be supplied to the EC motor, so that the actual motor speed can be adjusted to the speed set point.

Optionally, with a preset temperature/environment variable, the detected actual temperature/environment information, and motor speed information, the SC 304 instructs PWMS 306 to generate compatible waveforms to increase or decrease the speed of the motor accordingly.

If the standalone mode is used, the speed of the motor is regulated based on input differential voltage as set out above.

The scope of the invention should not be limited by specific embodiments or examples set forth herein but should be given the broadest interpretation consistent with the specification as a whole. The claims are not limited in scope to any preferred or exemplified embodiments of the invention.

The invention claimed is:

1. A rotation speed control system for an Electronically Commutated (EC) motor, comprising:
    a phase detector configured for detecting a period of a phase cut Alternating Current (AC) signal, an ON time interval of the phase cut AC signal, an OFF time interval of the phase cut AC signal, and zero crossing time points of the phase cut AC signal, wherein the phase detector comprises a zero crossing detector for detecting the zero crossing points of the phase cut AC signal and a floating voltage suppressor located before the zero crossing detector, wherein the floating voltage suppressor is configured to apply a momentary dynamic load at a pre-determined interval, and wherein the momentary dynamic load comprises a power transistor controlled by a Voltage Logic Control of the controller;
    a voltage regulator for converting the phase cut AC signal into a Direct Current (DC) signal;
    a controller for generating a compatible waveform to drive the EC motor with a rotation speed instructed by the controller, in accordance with an ON/OFF time ratio determined based on the ON time interval and OFF time interval of the phase cut AC signal; and
    an EC motor interface, powered by the DC signal from the voltage regulator, for driving each of a plurality of windings of the EC motor with the compatible waveform.

2. The rotation speed control system of claim 1, wherein the phase detector further comprises a period calculator for determining the period of the phase cut AC signal and the ON time interval of the phase cut AC signal, and an OFF time calculator for determining the OFF time interval of the phase cut signal.

3. The rotation speed control system of claim 2, wherein the zero crossing detector is an optocoupler, a comparison circuit, or a microcontroller.

4. The rotation speed control system of claim 2, wherein the period calculator is an optocoupler or a microcontroller.

5. The rotation speed control system of claim 2, wherein the period calculator determines the period of a trailing edge phase cut AC signal by measuring the time interval marking two consecutive high to low transitions.

6. The rotation speed control system of claim 2, wherein the period calculator determines period of a leading edge phase cut AC signal by measuring the time interval marking two consecutive low to high transitions.

7. The rotation speed control system of claim 2, wherein the OFF time calculator is an optocoupler or a microcontroller.

8. The rotation speed control system of claim 2, wherein the OFF time calculator determines the OFF time interval of a trailing edge phase cut signal by measuring the time interval between two consecutive high to low transitions.

9. The rotation speed control system of claim 2, wherein the OFF time calculator determines the OFF time interval of a leading edge phase cut signal by measuring the time interval between two consecutive low to high transitions.

10. The rotation speed control system of claim 1, wherein the floating voltage suppressor comprises a transistor, a resistive load, and a diode.

11. The rotation speed control system of claim 1, wherein the voltage regulator comprises a voltage regulator driver for converting the phase cut AC electrical signals into DC signals.

12. The rotation speed control system of claim 11, wherein the voltage regulator further comprises a current sensor for detecting the current of the DC signals output to the EC motor interface.

13. The rotation speed control system of claim 11, wherein the voltage regulator further comprises an accumulator to establish a trigger level of energy for powering the EC motor.

14. The rotation speed control system of claim 13, wherein the accumulator comprises a capacitor for discharging to power the EC motor during the off time of the phase cut AC electrical signals.

15. The rotation speed control system of claim 1, wherein the controller comprises a Voltage Logic Controller (VLC) for controlling the voltage regulator and the floating voltage suppressor, a Speed Controller (SC) for instructing a speed of the EC motor based on motor position information, a Pulse Width Modulation Sequencer (PWMS) for receiving instructed speed set point from the SC and generating compatible waveform to drive the EC motor, and a Motor Position Reader (MPR) for reading current positions of windings of the EC motor.

16. The rotation speed control system of claim 15, wherein the VLC controls the voltage regulation driver for performing a power factor correction (PFC) compensation.

17. The rotation speed control system of claim 15, wherein the VLC controls the voltage regulation driver to limit the current of the DC signals within a predetermined level.

18. The rotation speed control system of claim 15, wherein the SC determines the ON/OFF time ratio of the phase cut AC signal.

19. The rotation speed control system of claim 15, wherein the speed is determined by: Speed=(% of an active portion of the phase cut signal−an on time ratio)/(100%−the on time ratio).

20. The rotation speed control system of claim 15, wherein the SC determines a second speed based on DC available voltage from the voltage regulator.

21. The rotation speed control system of claim 19, wherein an actual speed of the EC motor is determined based on positions of the rotors of the EC motor.

22. The rotation speed control system of claim 15, wherein the SC compares an actual speed of the EC motor to the speed set point and adjusts the speed of the EC motor based on the DC voltage.

23. The rotation speed control system of claim 15, wherein the motor interface comprises a plurality of power drivers, each for driving a winding of the EC motor, and a position management system for detecting a position of the winding.

24. The rotation speed control system of claim 22, wherein the motor interface comprises a signal conditioning module for suppressing noise.

25. The rotation speed control system of claim 15, wherein the motor interface connects with and supply DC power to the EC motor.

26. The rotation speed control system of claim 1, wherein the EC motor interface is operably coupled to the EC motor.

27. A rotation system, comprising:
    a rotation speed control system of claim 1; and
    an Electronically Commutated (EC) motor operably coupled to the rotation speed control system.

28. The rotation speed control system of claim 1, wherein the EC motor starts rotating when the ON/OFF time ratio is higher than 50%.

29. The rotation speed control system of claim 15, wherein the SC instructs a speed set point of the EC motor, wherein the speed set point is a function of ON/OFF time ratio.

30. A rotation speed control system, comprising:
a voltage regulator for converting a phase cut signal to a DC signal;
an probe for detecting the level of an environmental variable within a selected environment,
a potentiometer for setting a selected target level of the environmental variable;
a controller for comparing the detected level of the environment variable with the target level whereby when the actual environment variable differs from the second environment variable, the controller instructs a speed and generates compatible wave forms to produce the speed of the EC motor; and
an EC motor interface, powered by the DC signal, for driving each of a plurality of windings of the EC motor with the compatible waveform; and
a phase detector configured for detecting a period of a phase cut Alternating Current (AC) signal, an ON time interval of the phase cut AC signal, an OFF time interval of the phase cut AC signal, and zero crossing time points of the phase cut AC signal, wherein the phase detector comprises a zero crossing detector for detecting the zero crossing points of the phase cut AC signal and a floating voltage suppressor located before the zero crossing detector, wherein the floating voltage suppressor is configured to apply a momentary dynamic load at a pre-determined interval, and wherein the momentary dynamic load comprises a power transistor controlled by a Voltage Logic Control of the controller.

31. The rotation speed control system of claim 30, wherein the environment variable comprises temperature.

32. The rotation speed control system of claim 30, wherein each of the probe and the potentiometer comprises a resistor.

33. The rotation speed control system of claim 31, wherein the speed is in a linear relation with the temperature within the range of a temperature corresponding with a minimum speed and a temperature ramp.

34. A method for controlling rotation speed of an EC motor, comprising:
applying a momentary dynamic load at a pre-determined interval to a phase cut AC signal, wherein the momentary dynamic load comprises a power transistor controlled by a Voltage Logic Control of a controller;
converting the phase cut AC signal to a DC signal;
detecting zero-crossing points, a period, and an off time interval of the phase cut AC signal;
instructing a speed of the EC motor according to an on/off time ratio based on the period and the off time interval of the phase cut AC signal;
generating a compatible waveform for driving the EC motor with the instructed speed; and
powering the EC motor with the DC signal.

35. The method of claim 34, further comprising detecting an actual speed of the EC motor.

36. The method of claim 34, further comprising adjusting the speed of EC motor is the actual speed is different from the instructed speed.

37. The rotation speed control system of claim 30, wherein a minimum speed of the EC motor is adjusted by the potentiometer.

38. A rotation speed control system for an Electronically Commutated (EC) motor, comprising:
a phase detector for detecting a period of a phase cut Alternating Current (AC) signal, an ON time interval of the phase cut AC signal, an OFF time interval of the phase cut AC signal, and zero crossing time points of the phase cut AC signal, wherein the phase detector comprises a zero crossing detector for detecting the zero crossing points of the phase cut AC signal and a floating voltage suppressor located before the zero crossing detector, wherein the floating voltage suppressor is configured to apply a momentary dynamic load for sinking a charge of a stray capacitance voltage at a pre-determined interval by forming a closed circuit;
a voltage regulator for converting the phase cut AC signal into a Direct Current (DC) signal;
a controller for generating a compatible waveform to drive the EC motor with a rotation speed instructed by the controller, in accordance with an ON/OFF time ratio determined based on the ON time interval and OFF time interval of the phase cut AC signal; and
an EC motor interface, powered by the DC signal from the voltage regulator, for driving each of a plurality of windings of the EC motor with the compatible waveform.

* * * * *